United States Patent
Ishisaki

(10) Patent No.: US 7,240,458 B2
(45) Date of Patent: Jul. 10, 2007

(54) TRANSPARENT PLASTIC FILM ROOF AND BUILDING USING THE SAME

(75) Inventor: Yoshiaki Ishisaki, Tokyo (JP)

(73) Assignee: Asahi Glass Green-Tec Co., Ltd., Tokyo (JP)

(*) Notice: Subject to any disclaimer, the term of this patent is extended or adjusted under 35 U.S.C. 154(b) by 0 days.

(21) Appl. No.: 11/315,499

(22) Filed: Dec. 23, 2005

(65) Prior Publication Data

US 2006/0130410 A1    Jun. 22, 2006

Related U.S. Application Data

(63) Continuation of application No. PCT/JP03/15280, filed on Nov. 28, 2003.

(30) Foreign Application Priority Data

Jun. 23, 2003  (JP) ............................. 2003-178072

(51) Int. Cl.
  *A01G 9/14*   (2006.01)
  *E04H 9/16*   (2006.01)
(52) U.S. Cl. .............................. 52/2.22; 52/13; 52/63; 52/86; 52/90.1; 52/222; 47/17
(58) Field of Classification Search ............ 52/2.11, 52/2.17, 2.19, 2.22, 2.24, 63, 86, 90.1, 222, 52/13, 2.23; 47/17
See application file for complete search history.

(56) References Cited

U.S. PATENT DOCUMENTS 4,265,300 A * 5/1981 Kurimoto ................. 165/47
4,387,533 A * 6/1983 Green et al. ................. 47/17
4,452,230 A * 6/1984 Nelson ..................... 126/621

(Continued)

FOREIGN PATENT DOCUMENTS

JP          53-17135       2/1978

(Continued)

OTHER PUBLICATIONS

The abstract of lectures at the joint convention of the Society of Agricultural Meteorology of Japan, National Convention 2000 and the Japanese Society of Environmental Control in Biology, National Convention 2000 refers to, at pp. 450 to 451.

*Primary Examiner*—Robert Canfield
(74) *Attorney, Agent, or Firm*—Oblon, Spivak, McClelland, Maier & Neustadt, P.C.

(57) ABSTRACT

There is provided a transparent plastic film roof for a building, comprising two transparent plastic films, which are fixed to edge rafters extending from a ridgepole to a ridge plate and are formed in a bag-like structure for serving as a building roof, wherein warm air is supplied from an air supply port into the bag-like structure to maintain the bag-like structure in a tensioned state, and air in the bag-like structure is discharged from an air discharge port.

There is also provided a multi-ridge building, wherein a liquid passing pipe is disposed in the same direction as long film-clamping assemblies in the vicinity of a valley portion of the multi-ridge roof formed by the two transparent plastic films, and wherein the liquid passing pipe is configured to pass warm water or warm antifreezing fluid therethrough.

13 Claims, 4 Drawing Sheets

U.S. PATENT DOCUMENTS

| | | | |
|---|---|---|---|
| 4,878,322 A | * | 11/1989 | Ikeda et al. .......... 52/2.18 |
| 5,027,564 A | * | 7/1991 | Lechner .............. 52/2.23 |
| 5,901,504 A | * | 5/1999 | Stoll et al. .......... 52/2.22 |

FOREIGN PATENT DOCUMENTS

| | | |
|---|---|---|
| JP | 63-32620 | 8/1988 |
| JP | 63-263021 | 10/1988 |
| JP | A-1-218527 | 8/1989 |
| JP | A-1-300831 | 12/1989 |
| JP | 6-317043 * | 11/1994 |
| JP | 7-8119 | 1/1995 |
| JP | 7-255291 | 10/1995 |
| JP | 9-107806 | 4/1997 |
| JP | 11-243789 | 9/1999 |
| JP | 2000-139237 | 5/2000 |
| JP | 2004-61 | 1/2004 |

* cited by examiner

TRANSPARENT PLASTIC FILM ROOF AND BUILDING USING THE SAME This application is a continuation of PCT/JP03/15280 filed Nov. 28, 2003.

TECHNICAL FIELD

The present invention relates to a roof having a dual structure, which is suitable for melting a pile of snow on the roof of a building or for keeping a room warm, and a building using such a roof, in particular a greenhouse.

BACKGROUND ART

Heretofore, as a snow melting device to be used for a greenhouse for helping to cultivate plants, there has been known a snow melting device, wherein a spraying pipe is disposed on an exterior side of the roof of a greenhouse, and groundwater or warm water is supplied and is sprayed out (e.g., JP-A-63-263021). However, this device has a problem in that unless water is discharged from the spraying pipe at, e.g., nights in winter, the water is frozen to damage the spraying pipe since the spraying pipe is exposed outdoor.

There has been also known a snow removing device, wherein snow on a sloping roof is slipped down toward a gutter, and the slipped snow is melted by a snow melting means disposed near to the gutter (e.g., JP-A-9-107806). This device utilizes a system, wherein a pile of snow on the roof is slipped down by heating the interior of a greenhouse by an air conditioner to warm the roof made of a covering material (such as a glass sheet or a rigid synthetic resin plate), melting the pile of snow on the roof and gradually moving down the melted snow toward the gutter along the roof. In this system, a hot water pipe and a warm water pipe having apertures formed therein are disposed in the gutter of this device, hot water is passed through the hot water pipe to destroy a snow bridge, and warm water is spouted from the apertures of the warm water pipe to melt the snow. The roof is formed by a plate, which has a single structure. The heat source for melting a pile of snow on the roof is the warm air in the greenhouse. This system has caused, e.g., problems that nozzles are frozen, that snow is accumulated in a tunnel shape above the gutter since nozzles fail to melt all the snow, that snow is insufficiently melted, that nozzles are clogged by dust and dirt, and that a powerful pump is needed since snow is melted by water, not air.

Additionally, there has been proposed a snow melting device, wherein a gutter is mounted in a valley portion between adjacent roofs of a multi-ridge house, a warm water circulating pipe is disposed in the gutter, and a warm air duct is disposed in the house in the vicinity of the valley portion to blow out warm air toward the valley portion (e.g., JP-A-11-243789). According to this device, snow, which has piled on the roofs covered with a plastic film, is melted by warm air in the greenhouse heated by a warm air blowing heater, and the melted snow is slipped down on the smooth film. Although a portion of the slipped snow stays in the gutter, that portion is drained along the gutter, being melted by the warm water circulating in the warm water pipe. When warm air is supplementarily blown out toward the film, a portion of the snow, which is located above the gutter and has a hollow portion formed therein, can be easily melted, which is effective to completely melt the snow or to melt the snow rapidly. Each of the roofs is formed by a plate, which has a single structure. The heat source for melting a pile of snow on the roof is the warm air in the greenhouse. However, this device has caused, e.g., problems that snow is insufficiently melted since the warm air is locally blown out, a powerful pump is needed to sufficiently melt the snow, and the pipe is frozen.

The abstract of lectures at the joint convention of the Society of Agricultural Meteorology of Japan, National Convention 2000 and the Japanese Society of Environmental Control in Biology, National Convention 2000 refers to, at pages 450 to 451, a house having a pneumatic structure roof and utilizing solar energy. It is described that the pneumatic structure roof is adopted for the purpose of ensuring a structural strength without drastically decreasing the daylight entering the house. However, it is not described that warm air is supplied in the pneumatic structure roof, i.e., the roof formed in a bag-like structure, and the air supplied into the bag-like roof is discharged. In other words, the air in the pneumatic structure roof is not effective in terms of heat insulation and of keeping the house warm since the air is not warm. When snow has piled on the roof, it is impossible to expect to obtain an effect to melt the snow.

DISCLOSURE OF INVENTION

It is an object of the present invention to solve the problems that have been caused in a conventional dual structure roof made of a transparent plastic film, in other words, to provide a roof and a building using such a roof, the roof without forming shade, the roof being capable of smoothly flowing down rain or water of melted snow or smoothly slipping down snow, being excellent in having snow melting and warm-keeping performance, of being durable, of being uniform in the thickness and the temperature distribution of a dual structure (bag-like structure), of easily assembled and constructed, of having good workability and of being inexpensive in material costs and construction cost.

According to a first aspect of the present invention, there is provided a transparent plastic film roof for a building, comprising two transparent plastic films, which are fixed to edge rafters extending from a ridgepole to a ridge plate and are formed in a bag-like structure for serving as a building roof, wherein warm air is supplied from an air supply port into the bag-like structure to maintain the bag-like structure in a tensioned state, and air in the bag-like structure is discharged from an air discharge port.

According to a second aspect of the present invention, the transparent plastic film roof for a building is preferably configured so that the bag-like structure has an intermediate portion fixed to a rafter so as to be divided in sections in a rafter direction.

According to a third aspect of the present invention, there is provided a transparent plastic film roof for a building, comprising two transparent plastic films, which are fixed to an arched exterior frame and are formed in a bag-like structure for serving as an arched roof, wherein the bag-like structure has an intermediate portion fixed to an arched intermediate frame so as to be divided in sections in a rafter direction, warm air is supplied from an air supply port into the bag-like structure to maintain the bag-like structure in a tensioned state, and air in the bag-like structure is discharged from an air discharge port.

According to a fourth aspect of the present invention, the transparent plastic film roof for a building is preferably configured so that a connection pipe is disposed between adjacent sections of the bag-like structure.

According to a fifth aspect of the present invention, there is provided a building, in particular a greenhouse, including the transparent plastic film roof defined in any one of the first to fourth aspects.

According to a sixth aspect of the present invention, there is provided a multi-ridge building using a multi-ridge roof comprising the transparent plastic film roof defined in any one of the first to fifth aspects, wherein a snow-melting duct, which comprises a transparent plastic film and is maintained in a tensioned state by supply of warm air, is disposed in a valley portion formed by confronting portions of the roof.

According to a seventh aspect of the present invention, the multi-ridge building is preferably configured so that a liquid passing pipe is disposed in the same direction as long film-clamping assemblies in the vicinity of the valley portions of the multi-ridge roof formed by the two transparent plastic films, and wherein the liquid passing pipe is configure to pass warm water or warm antifreezing fluid therethrough.

EXPLANATION OF REFERENCE NUMERALS

Figure 1:
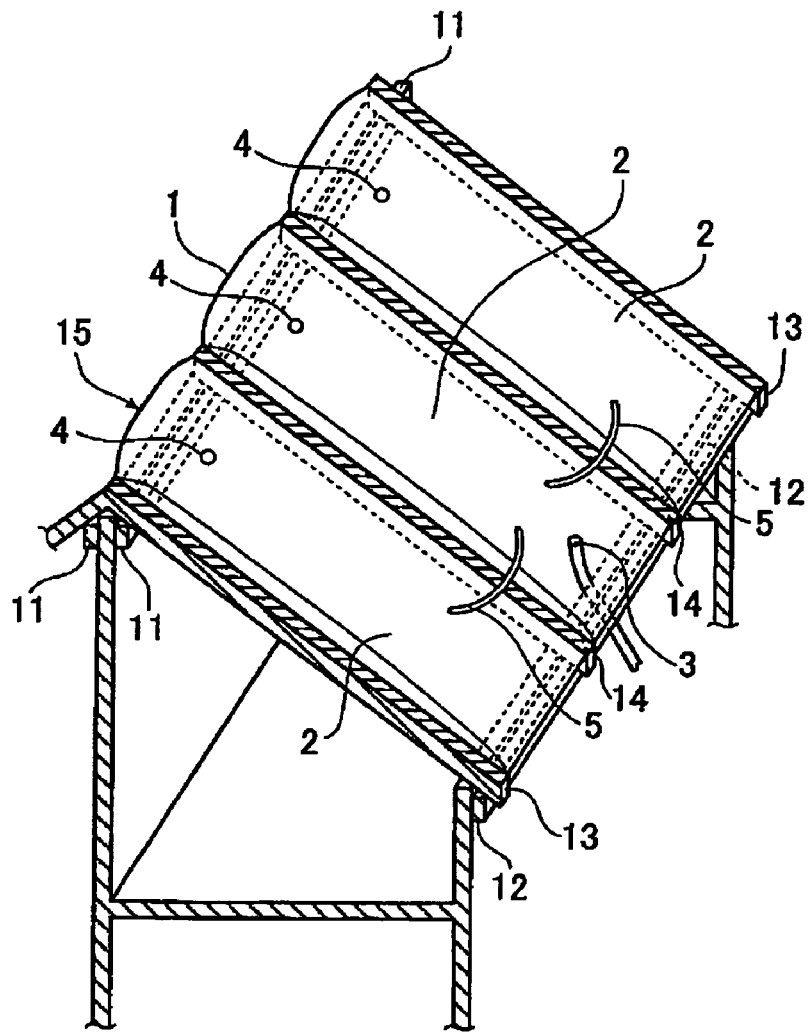
FIG. 1 is a schematic perspective view of the roof according to an embodiment of the present invention.

1: transparent plastic film
2: bag-like structure
3: air supply port
4: air discharge port
5: connection pipe
11: ridgepole
12: pole plate
13: edge rafter
14: rafter
15: roof
16: post
17: wall
18: valley portion
21: long film-clamping assembly (bottom receiver)
22: long film-clamping assembly (retainer)
31: snow melting duct
32: wing
33: tube
34: air supply port
35: air spouting port
36: pipe
41: liquid passing pipe

BEST MODE FOR CARRYING OUT THE INVENTION

A building, which is represented by a greenhouse having a gable roof, generally has a skeleton comprising a main body constructed by assembling members, such as poles, girders, binding beams, and a gable roof constructed by assembling members, such as a ridgepole, pole plates, edge rafters, rafters, purlins, and joining hands. The respective members mainly comprise metal pipes or section bars. These members are assembled by perpendicular clamps or universal clamps and are constructed as the skeleton comprising the main body and the roof. For example, a greenhouse is constructed by causing a sheet or film to extend between and be fixed to the skeleton, the sheet or film being mainly made of a transparent resin.

The structures of the main body and the roof of a building according to the present invention are not different from those of an ordinary building. The skeleton comprising the main body and the roof may be constructed in an ordinary way. A greenhouse, which is an example of a building roof according to the present invention and a building having such a roof, will be described, referring to accompanying drawings.

As shown in FIG. 1, a transparent plastic film roof according to the present invention comprises a gable roof 15, wherein two transparent plastic films 1 are fixed to edge rafters 13 so as to be formed in a bag-like structure, the edge rafters extending from a ridgepole 11 to a pole plate 12, the bag-like structure 2 is held in a tensioned state by warm air supplied from an air supply port 3, and air in the bag-like structure is discharged from air discharge ports 4. Preferably, the roof is configured so that the bag-like structure 2 has an intermediate portion fixed to rafters 14 so as to be divided into sections in a direction of the rafter, and that a connection pipe 5 is disposed between adjacent sections of the bag-like structure 2 to allow air to circulate between the adjacent sections of the bag-like structure 2.

The width of one section of the bag-like structure 2, i.e., the distance between adjacent rafters 14 or the distance between an edge rafter 13 and the rafter 14 closest thereto is preferably from 20 to 400 cm, more preferably from 30 to 250 cm.

The air supply port 3 has a diameter of preferably from 1 to 60 cm, more preferably from 4 to 30 cm. Each of the air discharge ports 4 has a diameter of preferably from 0.4 to 80 cm, more preferably from 0.5 to 40 cm. It is possible to control snow melting and warm-keeping performance by modifying the diameters of the air discharges ports 4. Each of the connection pipes 5 has a diameter of preferably from 1 to 60 cm.

Figure 2:
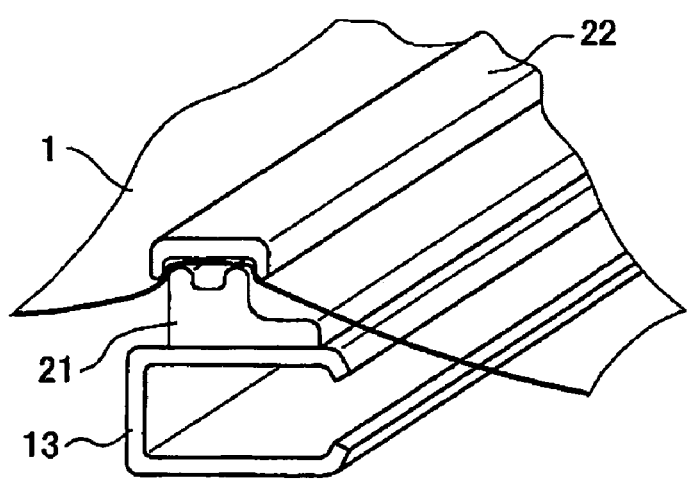
FIG. 2 is a schematic perspective view of an example of the long film-clamping assembly used in the present invention.

In order to fix the two transparent plastic films 1 to the rafters 14, respective opposed edges of the two transparent plastic films 1 or the transparent plastic film 1 as the bag-like structure, which form the roof 15, are carried on respective long film-clamping assemblies (bottom receivers) 21 fixed to the respective edge rafters 13, and respective long film-clamping assemblies (retainers) 22 are capped with the respective paired bottom receivers through the transparent plastic films as shown in FIG. 2. An example of the film-clamping assemblies 21 and 22 is a commercially available slide-lock type product "SURAIREIRU" (trademark: manufactured by Totokogyo company, LTD.). It should be noted that the fixing of the transparent plastic films 1 is not limited to such a preferred example.

Figure 5:
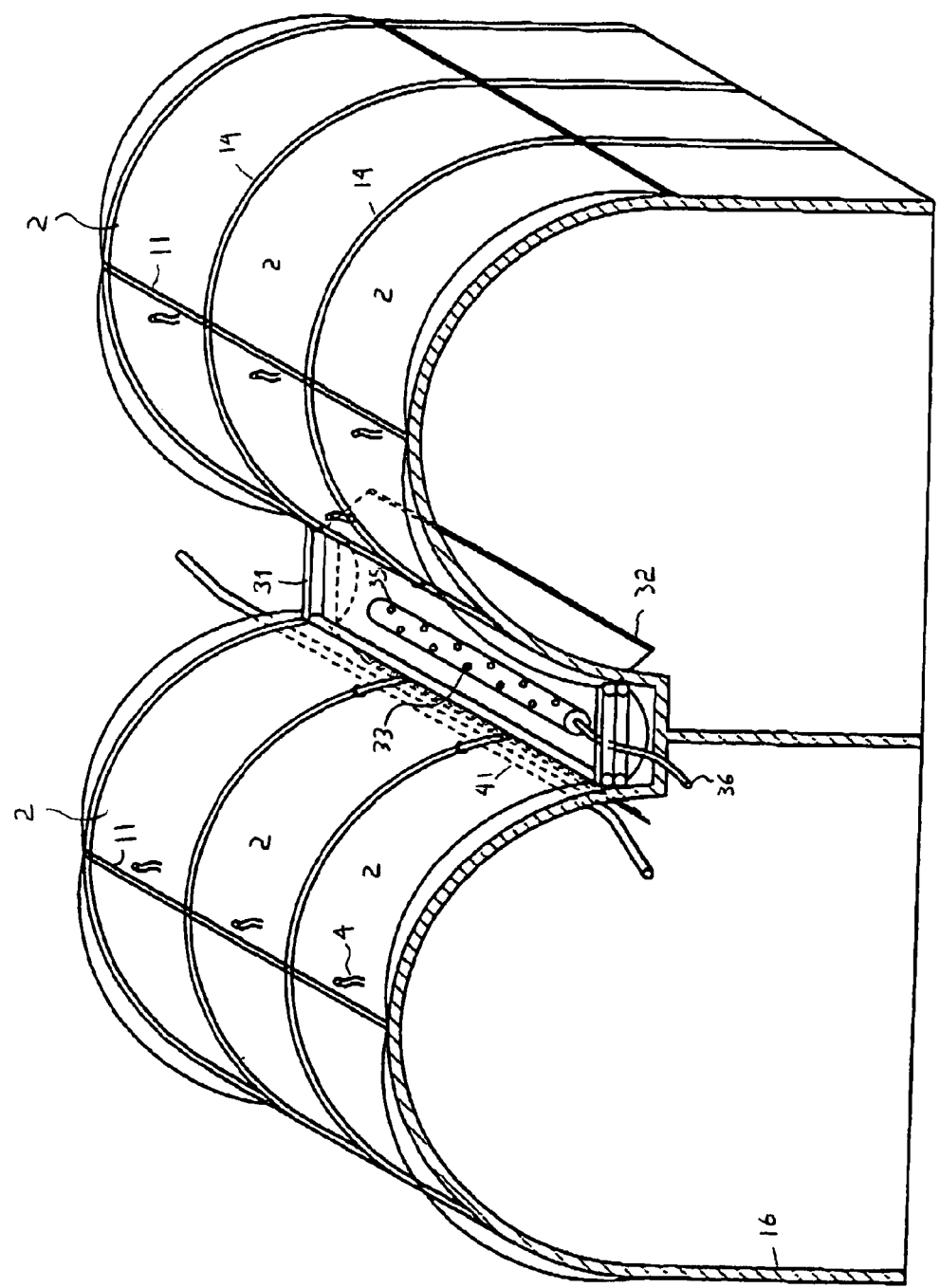
FIG. 5 is a schematic view of an arched roof.

When the greenhouse has a semi-cylindrical arched roof 15, as shown in FIG. 5 the semi-cylindrical arched roof is not basically different from the above-mentioned gable roof 15. In other words, the edge rafters 13 and the rafters 14 of the gable roof 15 are linear while the rafters of the arched roof are curved in an arched shape. Accordingly, the transparent plastic films 1 are fixed by use of curved and long film-clamping assemblies comprising bottom receivers 21 and retainers 22 in the same way as the above-mentioned gable roof.

Now, a greenhouse having the gable roof according to an appropriate embodiment of the present invention will be described, referring to FIG. 3. It should be noted that when the bag-like structure 2 is not divided in sections in a rafter direction, no connection pipe is needed since the intermediate portion of the bag-like structure 2 is not fixed to the rafters 14.

The greenhouse having the gable roof comprises a transparent plastic film roof 15, wherein two transparent plastic films 1 are fixed to edge rafters 13 so as to be formed in a bag-like structure, the edge rafters extending from a ridgepole 11 to a pole plate (not shown) of the gable roof 15, the bag-like structure has an intermediate portion fixed to rafters, and the bag-like structure is divided in sections in a direction parallel with the rafters, the sections of the bag-like structure 2 are held in a tensioned state by warm air supplied from an air supply port 3, and air in the sections of the bag-like structure 2 is discharged from air discharge ports 4. A connection pipe 5 is disposed between adjacent sections of the bag-like structure 2 so as to allow air to circulate between the adjacent sections of the bag-like structures 2.

The framework of the main body of the greenhouse comprises poles 16 and other appropriately used members forming a main body, such as girders and beams, which are assembled by use of aluminum perpendicular clamps, universal clamps and joints. The greenhouse has transparent plastic sheets or transparent plastic films 1 extending throughout the framework and fixed to the framework so as to form walls 17 by use of long film-clamping assemblies 21 and 22 shown in FIG. 2.

The greenhouse has an entrance formed by extending a transparent plastic sheet or a transparent plastic film 1 to a portion of the framework forming the entrance, fixing the sheet or the film to that portion of the framework by use of long film-clamping assemblies 21 and 22 as in the formation of the walls 17, and mounting a door (not shown) to that portion of the framework. It should be noted that the door is mounted to the main body of the greenhouse in order to ensure airtightness in the greenhouse.

It is preferred in terms of warm-keeping that the walls 17, in particular outer walls, comprise transparent plastic sheets or films 1 extending in a dual structure and formed in a bag-like structure.

It is preferred that a valley portion 18 of an multi-ridge greenhouse, which is formed by adjacent confronting inclined portions of a gable roof 15, have a snow melting duct 31 of a transparent plastic film disposed in the valley portion 18 so as to have the same length as the valley portion 18. The snow melting duct 31 has transparent plastic film wings 32 outwardly projecting from lateral sides thereof, overlapped with the transparent plastic films 1 forming the roof 15 and fixed to the edge rafters 13 by use of elongated film-clamping assemblies 21 and 22 as shown in FIG. 2. After having constructed the valley portion as stated above, a tube 33, which is disposed in and fixed to the snow melting duct 31 and is made of a transparent plastic film, is supplied with warm air through an air supply port 34 formed in the tube 33, and the snow duct 31 is held in a tensioned state by ejecting warm air from plural gas ejection ports 35 formed in the tube 33. Air in the bag-like structure is discharged from gaps formed in regions, where the rings 32 of the snow melting duct 31 are overlapped with the transparent resin films 1 and are jointed by the long film-clamping assemblies 21 and 22.

Figure 4:
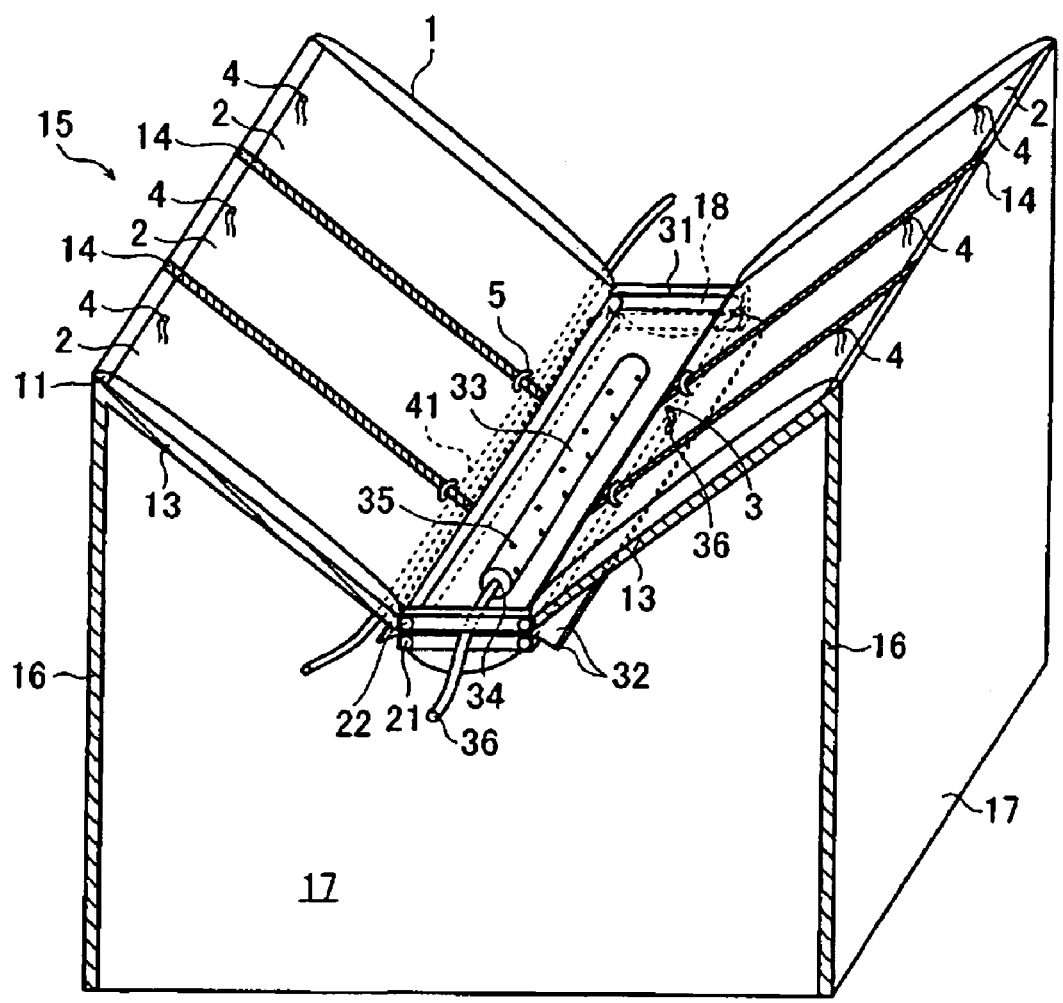
FIG. 4 is a schematic perspective view of the greenhouse according to another embodiment of the present invention.

In the case of such a multi-ridge greenhouse, it is preferred that a liquid passing pipe 41 be disposed so as to extend in the same direction of the long film-clamping assemblies 21 and 22 in the vicinity of a lower part of the valley portion formed by the confronting inclined portions of the gable roof 15, i.e., in the vicinity of the film-clamping assemblies 21 and 22 as shown in FIG. 4. It is more preferred that the liquid passing pipe 41 be disposed on each of the opposite sides of the confronting portions of the gable roof 15. The liquid passing pipe 41 is configured to pass warm water or a warm antifreezing fluid from outside the greenhouse. By passing the warm water or the warm antifreezing fluid through the liquid passing pipe 41 as well as supplying the warm air to the bag-like structure of the gable roof 15 and the snow melting duct 31, heat radiation from the liquid passing pipe 41 exerts synergistic effects, such as heating the air in the bag-like structure, causing snow to be smoothly and rapidly melted.

With respect to the length of the liquid passing pipe 41, the longer, the better. The liquid passing pipe may comprise a linear pipe or a curved pipe. The liquid passing pipe has a diameter of from 3 to 20 cm, preferably from 3 to 8 cm, and a wall thickness of from 0.05 to 5 mm, preferably from 0.1 to 0.2 mm. Although the liquid passing pipe is preferably made of plastics or metal and more preferably of a transparent plastic film, the liquid passing pipe is not limited to be made of any one of these materials.

The warm water or the warm antifreezing fluid has a temperature of from 50 to 95° C., preferably from 60 to 90° C., more preferably from 75 to 85° C. The flow rate of the warm water or warm antifreezing fluid may be properly determined, depending on how snow is melted.

Although the snow melting duct 31 is generally formed in a cylindrical shape or an angular cylindrical shape in section, the snow melting duct is not limited to be formed in any one of these shapes. The snow melting duct may be formed in another shape. When the snow melting duct is formed in an angular cylindrical shape, it is preferred that the angular ridges be not as sharp as possible. The dimensions of the snow melting duct 31 in section depend on the dimensions of the roof 15 of the greenhouse and the dimensions of the valley portion 18. When the snow melting duct is formed in a cylindrical shape, the duct has a diameter of preferably from 5 to 200 cm, more preferably from 25 to 150 cm. The snow melting duct 31 has substantially the same length as the length of the roof 15 and the length of the valley portion 18.

Water made from melted snow flows toward a drain opening (not shown) formed in an upper surface of the snow melting duct 31 of the valley portion 18, and the water is drained on the ground in the greenhouse or outside the greenhouse through a drain pipe (not shown) connected to the drain opening.

Although the tube 33 is generally formed in a cylindrical shape or an angular cylindrical shape in section, the tube is not limited to have any one of these shapes. The tube may be formed in another shape. When the tube is formed in an angular cylindrical shape, it is preferred that the angular ridges be not as sharp as possible. There are no particularly limitations to the dimensions of the tube 33 in section as long as the tube is movable in the snow melting duct 31. When the tube is made in a cylindrical shape, the tube has a diameter of preferably from 2 to 190 cm, more preferably from 5 to 50 cm. The tube 33 has a length of from about 70 to about 100% of the length of the snow melting duct 31. It is preferred that the transparent plastic film 1 forming the tube 33 be the same material as the transparent plastic film 1 forming the snow melting duct 31. When the transparent plastic film 1 forming the tube 33 is slightly thinner or slightly softer than the transparent plastic film forming the snow melting duct 31, the snow melting duct 31 is more unlikely to be damaged by movement of the tube 33 in the snow melting duct 31.

The air supply port 34 is formed on an upstream end of an outer surface of the tube 33. The air supply port has a diameter of preferably from 1 to 60 cm, more preferably from 4 to 30 cm. The air supply port 34 is configured to be capable of being connected to a pipe or tube 36, which extends from a device for generating warm air, such as a warm air blowing heater.

The plural air ejection ports 35 are formed at suitable intervals between the upstream end and a downstream end on a peripheral surface of the tube 33. The number of the air ejection ports 35 is preferably from 20 to 1,000 ports/m$^2$, more preferably from 40 to 400 ports/m$^2$. Each of the air ejection ports 35 has a diameter of preferably from 3 to 20 mm, more preferably from 5 to 15 mm.

The transparent plastic film may comprise a film made of thermoplastic resin, such as fluororesin, vinyl chloride resin, polyester resin or polyethylene resin. It is preferred in terms of transparency, mechanical strength, weatherability, resistance to UV light, heat resistance, melt-bonding property or the like that the transparent plastic film comprise a film made of fluororesin. Examples of the fluororesin are an ethylene/tetrafluoroethylene copolymer (hereinbelow, abbreviated as ETFE), a hexafluoropropylene/tetrafluoroethylene copolymer (hereinbelow, abbreviated as FEP), a perfluoro(alkyl vinyl ether)/tetrafluoroethylene copolymer (hereinbelow, abbreviated as PFA), a tetrafluoroethylene/hexafluoropropylene/vinylidene fluoride copolymer (hereinbelow, abbreviated as THV), polyvinylidene fluoride, a vinylidene fluoride/hexafluoropropylene copolymer, and polyvinyl fluoride. It is preferred that at least one is selected from the group consisting of ETFE, FEP and THV. It is more preferred that ETFE be selected. The thickness of the fluororesin film is determined in consideration of mainly the mechanical strength of the resin. The thickness is preferably from 40 to 200 µm, more preferably from 50 to 160 µm.

It is preferred that an inner surface of the transparent plastic film, which faces the interior side of a building, be subjected to hydrophilic treatment. Even if moisture in the interior side of a building is condensed on the transparent plastic film, this treatment allows the condensed water to easily flow on and along the transparent plastic film, thereby minimizing adverse effects, such as growth inhibition of crops by drops of condensed water. Preferred examples of the method for undergoing hydrophilic treatment are a method for using an applicator to coat or spraying a solution of, e.g., inorganic colloid, hydrophilic resin and a metal oxide, and a method for sputtering a metal oxide, such as a silicon oxide, a tin oxide and a titanium oxide.

Functions of the transparent plastic film roof according to the present invention and a greenhouse having such a roof will be explained.

Warm air is continuously supplied from, e.g., a warm air blowing heater into the inner space of the roof as the bag-like structure. The air in the bag-like structure serves to exhibit high snow melting performance and high warm-keeping performance since the air can maintain the bag-like structure in a suitable tensioned state and maintain the temperature in the bag-like structure in a desired temperature range. The air in the bag-like structure is discharged outside the bag-like structure from the discharge ports.

When a roof is configured so that a bag-like structure comprising the transparent plastic film according to the present invention is divided into sections along the rafter direction, or when a greenhouse has a such a roof, it is possible to effectively circulate and diffuse air (warm air) and to obtain high thermal efficiency in addition to the functions and advantages stated above. This is because the bag-like structure is divided so that each of the sections has suitable dimensions and a suitable volume. Additionally, water made by melting of snow or snow on the roof is more likely to slide down since each of the sections of the roof is inclined toward the divided portion of the bag-like structure (the rafter).

The duct disposed in the valley portion of the roof or the tube in the duct is continuously supplied with warm air (at a temperature of, e.g., 20° C.) from, e.g., a warm air blowing heater to be properly tensioned. At that time, when the temperature in the duct is controlled so as to be much higher than the temperature in the greenhouse, snow that has piled in the valley portion can be rapidly melted through the transparent plastic film forming the duct. Since the bag-like structure is fixed to the rafters, snow and/or water made by melting of snow almost uniformly and smoothly flows in the same direction from the ridgepole toward the pole plate without extremely meandering. Accordingly, almost no snow piles. It is preferred that water made by melting of snow be discharged through the drain opening formed in the snow melting duct or the drain pipe.

Figure 3:
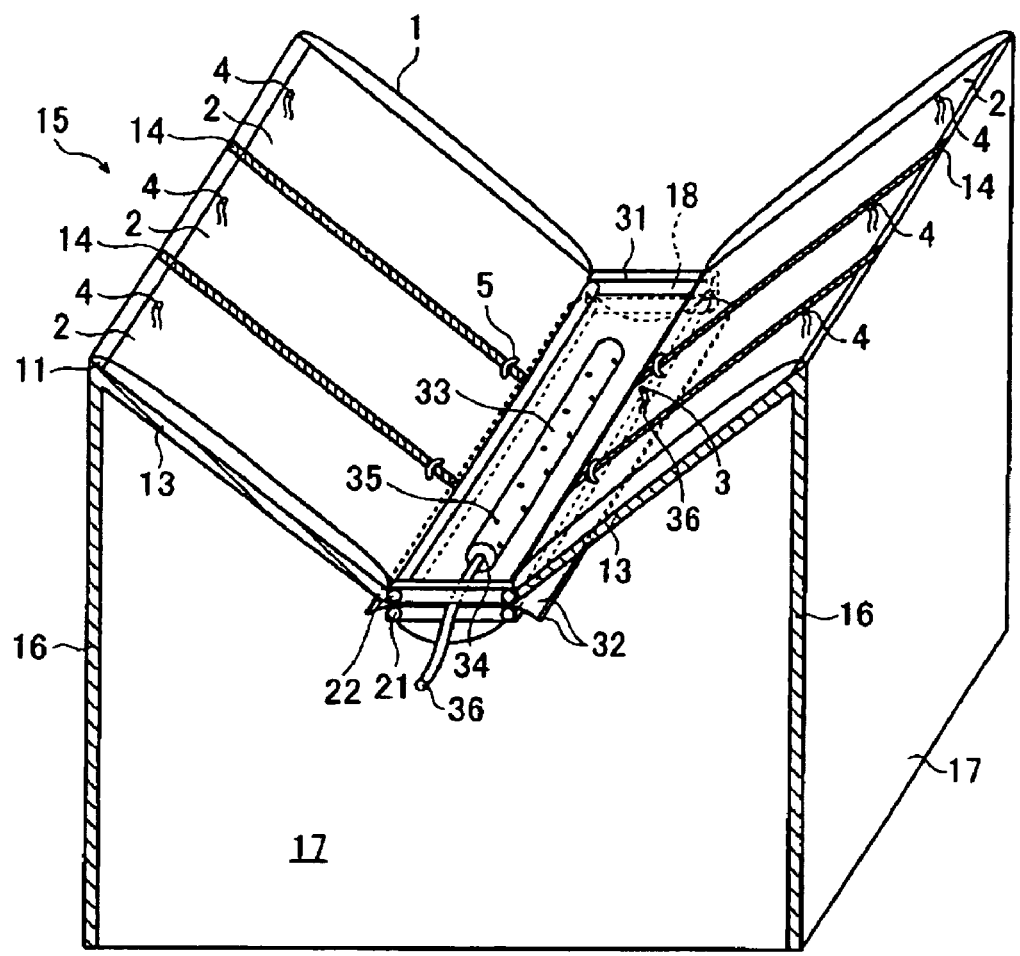
FIG. 3 is a schematic perspective view of the greenhouse according to an embodiment of the present invention.

Now, a preferred example of the present invention will be more specifically described in reference to the embodiment shown in FIG. 3.

A greenhouse, which was constructed from poles 16, ridgepoles 11, edge rafters 13 and other members, which had a distance of 12 m between front poles, a depth of 6 m and a height of 6.3 m, which had a valley portion 18 of a roof 15 positioned at an intermediate point between the poles 16 on each of the front side and the rear side, and which had the roof 15 set at an inclination angle of 20°, was built on a farm at Urausu-cho, Kabato-gun, Hokkaido, Japan. An ETFE film (having at thickness of 100 µm, manufactured by Asahi Glass Company, Limited, commercially available in the trade mark "F-CLEAN) was extended throughout the entire surface from the edge rafters 13 to the ground around the poles 16, thereby forming a wall 17. The roof 15 was constructed by extending double ETFE films on roof frames, such as the edge rafters 13 and rafters 14.

In the valley portion 18 formed by confronting portions of the roof 15, edge wings 32 of a snow melting duct 31, which was formed from two ETFE films, were overlapped with edge portions of the double ETFE films forming the roof 15. The snow melting duct 31 (having a width of 108 cm, a height of 40 cm and a length of 600 cm) was fixed to the roof frame by clamping the overlapped portions between film-clamping assemblies 21 and 22 as shown in FIG. 2. Although the snow melting duct was fixed to the roof frame, a gap was formed in the overlapped portions of the transparent plastic films. In the snow melting duct 31, a tube 33, which had a length extending by the same as the length of the valley portion 18 and had a diameter of 10 cm, was disposed. The tube 33 had gas ejection ports 35 formed therein at intervals of 80 ports/m$^2$, the gas ejection ports having a diameter of 1 cm.

Next, warm air from the warm air blowing heater was supplied from an air supply port 34 (having a diameter 5 cm) of the tube 33 through a pipe 36 (having a diameter 5 cm)

to maintain the tube 33 in a tensioned state, while warm air was ejected into the snow melting duct 31 from the gas ejection ports 35 of the peripheral surface of the tube 33 to maintain the snow melting duct 31 in a tensioned state. Air in the snow melting duct 31 was discharged outside the greenhouse through a gap, which was formed, although the overlapped transparent plastic films were clamped by the film-clamping assemblies 21 and 22. Additionally, warm air from the warm air blowing heater was supplied from an air supply port 3 (having a diameter 5 cm) through a pipe 36 (having a diameter 5 cm) to the inner space between the two transparent plastic films forming the roof 15. The warm air was distributed over in the roof 15 through connection pipe 5 (having a diameter 5 cm). The air in the roof 15 was discharged from air discharge ports 4 (having a diameter 1 cm).

Warm air was constantly supplied into the tube 33 for about 2 months from Feb. 1 to Apr. 5, 2002. The warm air had a temperature of 44.4° C.±8.4° C. at the air supply port 34, a temperature of from 29.4° C. to −14.5° C. at the gas ejection ports 35 and a flow rate of 0.1 m$^3$/min. The warm air that was supplied into the space in the bag-like structure formed by the two transparent plastic films of the roof 15 had a temperature of from 44.4 to 8.4° C. at the air supply port 3, a temperature of from 52.5 to −0.3° C. at the air discharge ports 4 and a flow rate of 0.1 m$^2$/min.

The total amount of snowfall during that period was 217 cm, all the snow that fell on the roof 15 was melted, and no snow piled. Although the maximum amount of snowfall per day during that period was 16 cm on March 4, all the snow that fell on the roof and the snow melting duct 31 on the same date (having the highest temperature of −1.1° C. and the lowest temperature of −6.2° C.) was melted, and no snow piled

INDUSTRIAL APPLICABILITY

Although the rafters for dividing the bag-like structure into sections and the long film-clamping assemblies for fixing the bag-like structure to the rafters are disposed, there is not created shade, which has a significant adverse effect on the growth in the greenhouse. This is because the roof according to the present invention comprises lightweight and transparent plastic films. Accordingly, it is possible to make the best use of the cultivated acreage in the greenhouse. Additionally, when the plastic films comprise fluororesin films, the period until replacement of plastic films can set at a long term of more than a dozen years since fluororesin films are good at weatherability, resistance to UV light, mechanical strength or the like.

The roof according to the present invention is formed in a bag-like shape and includes the air supply port and the air discharge ports. The roof is excellent in terms of snow melting performance and warm keeping property in the greenhouse since warm air can be constantly supplied into the bag-like structure from, e.g., a warm air blowing heater.

When the roof according to the present invention is divided into sections having a suitable size and volume in the bag-like structure, high heat efficiency can be obtained since it is possible to reduce the range of inequality or variation in the temperature distribution in the bag-like structure, i.e., the roof when the warm air supplied into the bag-like structure has diffused in the bag-like structure. Additionally, snow or water made by melting of snow is more likely to slide down on the roof since the respective sections of the roof are inclined toward portions, where the bag-like structure are divided (the rafter directions). Additionally, the bag-like structure, i.e., the roof can be restrained from being displaced by, e.g., a blast passing outside the greenhouse since the bag-like structure is divided into sections. The roof according to the present invention also has an advantage to be capable of reducing an area to repair or restore when the bag-like structure, i.e., the roof is damaged and broken for some reason. Since no partition is formed so as to extend across the inclined surface extending from the ridgepole to the pole plate in each of the divided sections of the gable roof, rainwater or water made by melting of snow can flow down in a direction from the ridgepole to the pole plate without any trouble, snow can slide down in this direction without any trouble. Additionally, it is possible to prevent snow from piling on an upper portion of the ridgepole.

When double transparent plastic films are preliminarily extended on the framework of a roof preliminarily assembled on the ground, or when a pre-fabricated roof with a bag-like transparent plastic film preliminarily extended thereon is lifted onto the main body framework of a greenhouse with a crane, workability in assembling the greenhouse can be improved.

When the transparent plastic film duct is disposed in the valley portion of a roof, snow, which has piled on the duct, or snow, which has slid down onto the duct, can be rapidly melted by warm air supplied into the duct.

Additionally, by passing warm water or a warm antifreezing fluid through the liquid passing pipe 41, and by supplying warm air into the bag-like structure, it is possible to have a synergistic effect and to cause snow to be smoothly and rapidly melted.

The 2003-178072 filed on Jun. 23, 2003 including specification, claims, drawings and summary is incorporated herein by reference in its entirety.

What is claimed is:

1. A multi-ridge roof comprising:
   a transparent plastic film roof including two transparent plastic films, which are fixed to edge rafters extending from a ridgepole to a ridge plate and are formed in a bag-like structure for serving as a building roof; an air supply port into which warm air is supplied into the bag-like structure to maintain the bag-like structure in a tensioned state; an air discharge port from which air in the bag-like structure is discharged; and
   a snow-melting duct, which includes a transparent plastic film and is maintained in a tensioned state by supply of warm air, is disposed in a valley portion formed by confronting portions of the roof.

2. The multi-ridge roof according to claim 1, wherein the bag-like structure has an intermediate portion fixed to a rafter so as to be divided in sections in a rafter direction.

3. The multi-ridge roof according to claim 2, wherein a connection pipe is disposed between adjacent sections of the bag-like structure.

4. The multi-ridge roof according to claim 1, wherein the transparent plastic films comprise fluororesin films.

5. A building using the multi-ridge roof defined in claim 1.

6. A greenhouse using the multi-ridge roof defined in claim 1.

7. A multi-ridge roof comprising:
   a transparent plastic film roof including, two transparent plastic films, which are fixed to an arched exterior frame and are formed in a bag-like structure for serving as an arched roof; an air supply port into which warm air is supplied into the bag-like structure to maintain the bag-like structure in a tensioned state; an air discharge port from which air in the bag-like structure is discharged; and a snow-melting duct, which includes a transparent plastic film and is maintained in a tensioned state by supply of warm air, is disposed in a valley portion formed by confronting portions of the roof.

8. The multi-ridge roof according to claim 7, wherein a connection pipe is disposed between adjacent sections of the bag-like structure.

9. The multi-ridge roof according to claim 7, wherein the transparent plastic films comprise fluororesin films.

10. A building using the multi-ridge roof defined in claim 7.

11. A greenhouse using the multi-ridge roof defined in claim 7.

12. The multi-ridge roof according to claim 7, further comprising:

a liquid passing pipe disposed in the same direction as long film-clamping assemblies in the vicinity of a valley portion of the multi-ridge roof formed by the two transparent plastic films, and wherein the liquid passing pipe is configured to pass warm water or warm anti-freezing fluid therethrough.

13. The multi-ridge roof according to claim 7, wherein the bag-like structure has an intermediate portion fixed to an arched intermediate frame so as to be divided in sections in a rafter direction.

* * * * *